US007433817B2

(12) United States Patent
Kjörling et al.

(10) Patent No.: US 7,433,817 B2
(45) Date of Patent: Oct. 7, 2008

(54) APPARATUS AND METHOD APPLYING ADAPTIVE SPECTRAL WHITENING IN A HIGH-FREQUENCY RECONSTRUCTION CODING SYSTEM

(75) Inventors: Kristofer Kjörling, Solna (SE); Per Ekstrand, Stockholm (SE); Fredrik Henn, Bromma (SE); Lars Villemoes, Jarfalla (SE)

(73) Assignee: Coding Technologies AB, Stockholm (SE)

( * ) Notice: Subject to any disclaimer, the term of this patent is extended or adjusted under 35 U.S.C. 154(b) by 188 days.

(21) Appl. No.: 11/247,176

(22) Filed: Oct. 12, 2005

(65) Prior Publication Data

US 2006/0036432 A1 Feb. 16, 2006

Related U.S. Application Data

(62) Division of application No. 09/987,475, filed on Nov. 14, 2001, now Pat. No. 7,003,451.

(30) Foreign Application Priority Data

Nov. 14, 2000 (SE) .................................... 0004163

(51) Int. Cl.
*G01L 19/02* (2006.01)

(52) U.S. Cl. .................... 704/229; 704/219; 704/200.1; 704/500

(58) Field of Classification Search ................. 704/500, 704/219, 229, 200.1, 230, 225, 201, 206, 704/205; 375/240; 370/495, 497, 527, 529; 381/1, 23

See application file for complete search history.

(56) References Cited

U.S. PATENT DOCUMENTS

| | | | | | |
|---|---|---|---|---|---|
| 4,361,875 | A | * | 11/1982 | Hertz et al. | 708/311 |
| 4,776,014 | A | * | 10/1988 | Zinser, Jr. | 704/262 |
| 5,127,054 | A | | 6/1992 | Hong et al. | |
| 5,347,611 | A | | 9/1994 | Chang | |
| 5,504,832 | A | * | 4/1996 | Taguchi | 704/201 |
| 5,619,566 | A | * | 4/1997 | Fogel | 379/406.07 |
| 5,621,856 | A | | 4/1997 | Akagiri | |
| 5,812,971 | A | * | 9/1998 | Herre | 704/230 |

(Continued)

FOREIGN PATENT DOCUMENTS

JP 2002-202790 A1 12/2000

(Continued)

OTHER PUBLICATIONS

Digital Processing of Speech Signals, Rabiner & Schafer, Prentice Hall, Inc., Englewood Cliffs, New Jersey 07632, Chapter 8, pp. 396-455., 1978.

(Continued)

*Primary Examiner*—Vijay B Chawan
(74) *Attorney, Agent, or Firm*—Glenn Patent Group; Michael A. Glenn

(57) ABSTRACT

The present invention proposes a new method and a new apparatus for enhancement of audio source coding systems utilising high frequency reconstruction (HFR). It utilises adaptive filtering to reduce artifacts due to different tonal characteristics in different frequency ranges of an audio signal upon which HFR is performed. The present invention is applicable to both speech coding and natural audio coding systems.

13 Claims, 10 Drawing Sheets

U.S. PATENT DOCUMENTS

| | | | | | |
|---|---|---|---|---|---|
| 5,822,360 | A * | 10/1998 | Lee et al. | 375/140 |
| 5,915,235 | A * | 6/1999 | DeJaco et al. | 704/234 |
| 5,995,561 | A * | 11/1999 | Yamasaki et al. | 375/341 |
| 6,035,177 | A * | 3/2000 | Moses et al. | 725/22 |
| 6,249,762 | B1 * | 6/2001 | Kirsteins et al. | 704/233 |
| 6,574,593 | B1 | 6/2003 | Gao et al. | |
| 6,680,972 | B1 * | 1/2004 | Liljeryd et al. | 375/240 |
| 6,772,114 | B1 * | 8/2004 | Sluijter et al. | 704/220 |
| 7,003,451 | B2 * | 2/2006 | Kjorling et al. | 704/206 |

FOREIGN PATENT DOCUMENTS

| | | |
|---|---|---|
| JP | 2002-202790 | 7/2002 |
| WO | WO86/03872 | 7/1986 |
| WO | WO-86/03872 A | 7/1986 |
| WO | WO98/57436 | 12/1998 |
| WO | WO-98/57436 A | 12/1998 |
| WO | WO00/45379 | 8/2000 |
| WO | WO-00/45379 A | 8/2000 |

OTHER PUBLICATIONS

Digital Signal Processing, Principles, Algorithms and Applications, Third Edition, John G. Proakis, Dimitris G. Manolakis, Prentice Hall, International Editions, Chapter 11, pp. 852-893.

Makhoul, J. et al., "Predictive and Residual Encoding of Speech," J. Acoust. Soc. Am., Dec. 1979, pp. 1633-1641, vol. 66, No. 6., Acoustical Society of America.

Holger, C. et al., M. et al., "Bandwidth Enhancement of Narrow-Band Speech Signals," Signal Processing VII Theories and Applications, Proceedings of EUSIPCO-94, Seventh European Signal Processing Conference, Sep. 13-16, 1994, pp. 1178-1181, vol. II, European Association For Signal processing, Laussanne, Switzerland.

Bredemann et al. ("Block Adaptive Filtering Wtih Application To Real-Time Broadband RF Spectral Whitening", Conference Record of the Twenty-Ninth Asilomar Conference on Signals, Systems and Computers, Nov. 1995).

Makhoul et al. ("High-Frequency Regeneration In Speech Coding Systems," IEEE International Conference Acoustics, Speech, and Signal Processing, Apr. 1979).

Mignone et al. ("CD3-OFDM: A Novel Demodulation Scheme For Fixed And Mobile Receivers," IEEE Transactions on Communications, Sep. 1996.

Borsuk et al., "CCD Adaptive Filtering for Robust LPC Speech Processing", IEEE International Conference on Acoustics, Speech, and Signal Processing, Apr. 1979, pp. 232-234.

Bredemann, et al., "Block Adaptive Filtering with Application to Real-Time Broadband RF Spectral Whitening", Conference Record of the Twenty-Ninth Asilomar Conference on Signals, Systems and Computers, Nov. 1995, pp. 641-644.

Holger, C. et al., "Bandwidth Enhancement of Narrow-Band Speech Signals", Signal Processing VII Theories and Applications, Proceedings of EUSIPCO-94, Seventh European Association for Signal Processing, Lausanne, Switzerland.

Makhoul et al., "High-Frequency Regeneration in Speech Coding Systems", IEEE International Conference Acoustics, Speech, and Signal Processing, Apr. 1979, pp. 428-431.

Makhoul, J. et al., "Predictive and Residual Encoding of Speech", J. Acoust. Soc. Am., Dec. 1979, Acoustical Society of America, vol. 66, No. 6, pp. 1633-1641,.

Mignone et al., "CD3-OFDM: A Novel Demodulation Scheme for Fixed and Mobile Receivers", IEEE Transactions on Communications, vol. 44, No. 9, Sep. 1996, pp. 1144-1151.

John G. Proakis et al., "Linear Prediction and Optimum Linear Filters", Digital Signal Processing, Principles, Algorithms and Applications, Third Edition, Chapter 11, pp. 852-893.

Rabiner et al., "Linear Predictive Coding of Speech", Digital Processing of Speech Signals, Prentice Hall, Inc., Englewood Cliffs, New jersey, Chapt. 8, pp. 396-455, 1978.

* cited by examiner

APPARATUS AND METHOD APPLYING ADAPTIVE SPECTRAL WHITENING IN A HIGH-FREQUENCY RECONSTRUCTION CODING SYSTEM

This application is a Divisional of application Ser. No. 09/987,475 filed on Nov. 14, 2001, now U.S. Pat. No. 7,003, 451 and for which priority is claimed under 35 U.S.C. § 120; and this application claims priority of Application No. 0004163-2 filed in Sweden on Nov. 14, 2000 under 35 U.S.C. § 119; the entire contents of all are hereby incorporated by reference.

TECHNICAL FIELD

The present invention relates to audio source coding systems utilising high frequency reconstruction (HFR) such as Spectral Band Replication, SBR [WO 98/57436] or related methods. It improves performance of high quality methods (SBR), as well as low quality methods [U.S. Pat. No. 5,127, 054]. It is applicable to both speech coding and natural audio coding systems.

BACKGROUND OF THE INVENTION

In high frequency reconstruction of audio signals, where a highband is extrapolated from a lowband, it is important to have means to control the tonal components of the reconstructed highband to a greater extent than what can be achieved with a coarse envelope adjustment, as commonly used in HFR systems. This is necessary since the tonal components for most audio signals such as voices and most acoustic instruments, usually are stronger in the low frequency regions (i.e. below 4-5 kHz) compared to the high frequency regions. An extreme example is a very pronounced harmonic series in the lowband and more or less pure noise in the high band. One way to approach this is by adding noise adaptively to the reconstructed highband (Adaptive Noise Addition [PCT/SE00/00159]). However, this is sometimes not enough to suppress the tonal character of the lowband, giving the reconstructed highband a repetitive "buzzy" sound character. Furthermore, it can be difficult to achieve the correct temporal characteristics of the noise. Another problem occurs when two harmonic series are mixed, one with high harmonic density (low pitch) and the other with low harmonic density (high pitch). If the high-pitched harmonic series dominates over the other in the lowband but not in the highband, the HFR causes the harmonics of the high-pitched signal to dominate the highband, making the reconstructed highband sound "metallic" compared to the original. None of the above-described scenarios can be controlled using the envelope adjustment commonly used in HFR systems. In some implementations a constant degree of spectral whitening is introduced during the spectral envelope adjustment of the HFR signal. This gives satisfactory results when that particular degree of spectral whitening is desired, but introduces severe artifacts for signal excerpts that do not benefit from that particular degree of spectral whitening.

SUMMARY OF THE INVENTION

The present invention relates to the problem of "buzziness" and "metallic"-sound that is commonly introduced in HFR-methods. It uses a sophisticated detection algorithm on the encoder side to estimate the preferable amount of spectral whitening to be applied in the decoder. The spectral whitening varies over time as well as over frequency, ensuring the best means to control the harmonic contents of the replicated highband. The present invention can be carried out in a time-domain implementation as well as in a subband filterbank implementation.

The present invention comprises the following features:

In the encoder, estimating the tonal character of an original signal for different frequency regions at a given time.

In the encoder, estimating the required amount of spectral whitening, for different frequency regions at a given time, in order to obtain a similar tonal character after HFR in the decoder, given the HFR-method used in the decoder.

Transmitting the information on preferred degree of spectral whitening from the encoder to the decoder.

In the decoder, perform spectral whitening in either the time domain or in a subband filterbank, in accordance with the information transmitted from the encoder.

The adaptive filter used for spectral whitening in the decoder is obtained using linear prediction.

The degree of spectral whitening required is assessed in the encoder by means of prediction.

The degree of spectral whitening is controlled by varying the predictor order, or by varying the bandwidth expansion factor of the LPC polynomial, or by mixing the filtered signal, to a given extent, with the unprocessed counterpart.

The ability to use a subband filterbank achieving low-order predictors, offers very effective implementation, especially in a system where a filterbank already is used for envelope adjustment.

Frequency selective degree of spectral whitening is easily obtained given the novel filterbank implementation of the present invention.

BRIEF DESCRIPTION OF THE DRAWINGS

The present invention will now be described by way of illustrative examples, not limiting the scope or spirit of the invention, with reference to the accompanying drawings, in which.

DESCRIPTION OF PREFERRED EMBODIMENTS

The below-described embodiments are merely illustrative for the principles of the present invention for improvement of high frequency reconstruction systems. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

When adjusting a spectral envelope of a signal to a given spectral envelope a certain amount of spectral whitening is always applied. This, since if the transmitted coarse spectral envelope is described by $H_{envRef}(z)$ and the spectral envelope of the current signal segment is described by $H_{envCur}(z)$, the filter function applied is $$W(z) = \frac{H_{envRef}(z)}{H_{envCur}(z)}. \tag{1}$$

In the present invention the frequency resolution for $H_{envRef}(z)$ is not necessarily the same as for $H_{envCur}(z)$. The invention uses adaptive frequency resolution of $H_{envCur}(z)$ for envelope adjustment of HFR signals. The signal segment is filtered with the inverse of $H_{envCur}(z)$, in order to spectrally whiten the signal according to Eq. 1. If $H_{envCur}(z)$ is obtained using linear prediction, it can be described according to $$H_{envCur}(z) = \frac{G}{A(z)}, \tag{2}$$

where $$A(z) = 1 - \sum_{k=1}^{p} \alpha_k z^{-k} \tag{3}$$

is the polynomial obtained using the autocorrelation method or the covariance method [Digital Processing of Speech Signals, Rabiner & Schafer, Prentice Hall, Inc., Englewood Cliffs, N.J. 07632, ISBN 0-13-213603-1, Chapter 8], and G is the gain. Given this, the degree of spectral whitening can be controlled by varying the predictor order, i.e. limiting the order of the polynomial A(z), and thus limiting the amount of fine structure that can be described by $H_{envCur}(z)$, or by applying a bandwidth expansion factor to the polynomial A(z). The bandwidth expansion is defined according to the following; if the bandwidth expansion factor is ρ, the polynomial A(z) evaluates to $$A(\rho z) = a_0 z^0 \rho^0 + a_1 z^1 \rho^1 + a_2 z^2 \rho^2 + \ldots + a_p z^p \rho^p. \tag{4}$$

Figure 1:
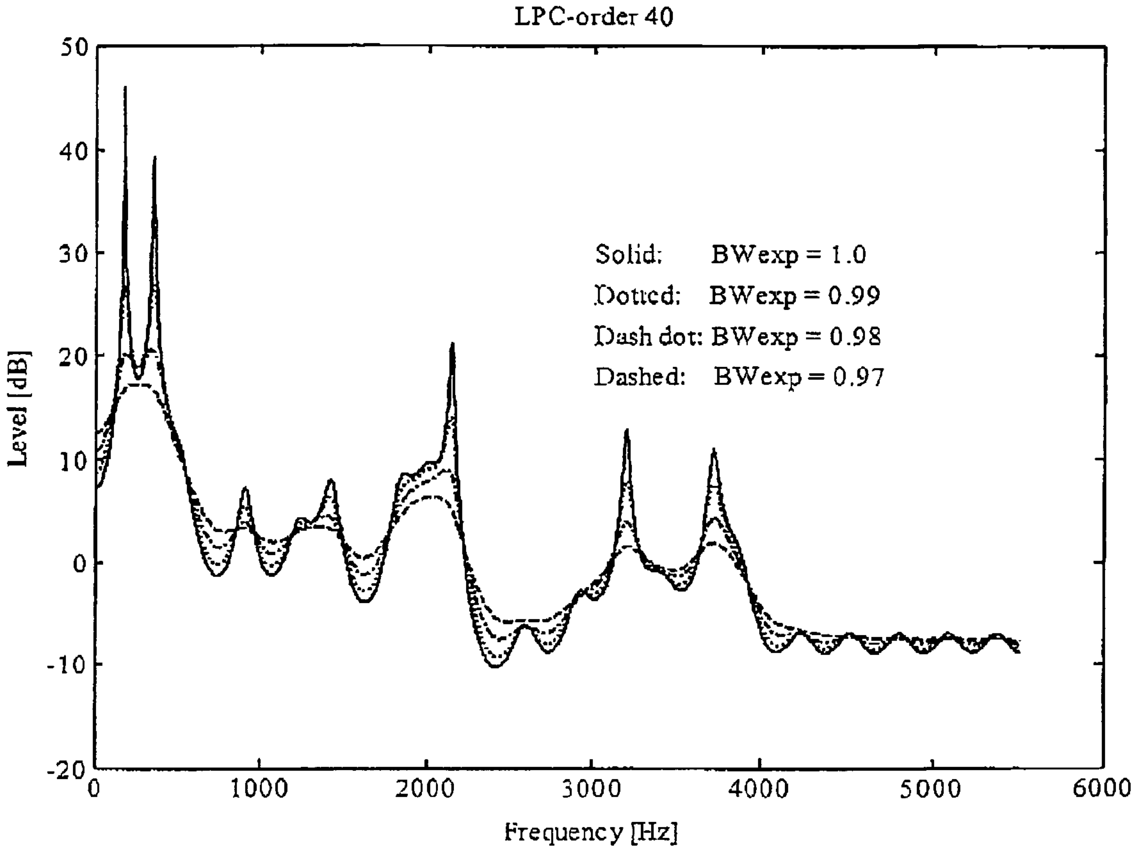
FIG. 1 illustrates bandwidth expansion of an LPC spectrum.

This expands the bandwidth of the formants estimated by $H_{envCur}(z)$ according to FIG. 1. The inverse filter at a given time is thus, according to the present invention, described as $$H_{inv}(z, p, \rho) = \frac{1 - \sum_{k=1}^{p} \alpha_k (z\rho)^{-k}}{G}, \tag{5}$$

where p is the predictor order and ρ is the bandwidth expansion factor.

The coefficients $\alpha_k$ can, as mentioned above, be obtained in different manners, e.g. the autocorrelation method or the covariance method. The gain factor G can be set to one if $H_{inv}$ is used prior to a regular envelope adjustment. It is common practice to add some sort of relaxation to the estimate in order to ensure stability of the system. When using the autocorrelation method this is easily accomplished by offsetting the zero-lag value of the correlation vector. This is equivalent to addition of white noise at a constant level to the signal used to estimate A(z). The parameters p and ρ are calculated based on information transmitted from the encoder.

An alternative to bandwidth expansion is described by:

$$A_b(z) = 1 - b + b \cdot A(z), \tag{6}$$

where b is the blending factor. This yields the adaptive filter according to:

$$H_{inv}(z, p, b) = \frac{1 - b + b \cdot \left(1 - \sum_{k=1}^{p} \alpha_k (z)^{-k}\right)}{G}. \tag{7}$$

Here it is evident that for b=1 Eq. 7 evaluates to Eq. 5 with ρ=1, and for b=0 Eq. 7 evaluates to a constant non-frequency selective gain factor.

Figure 2:
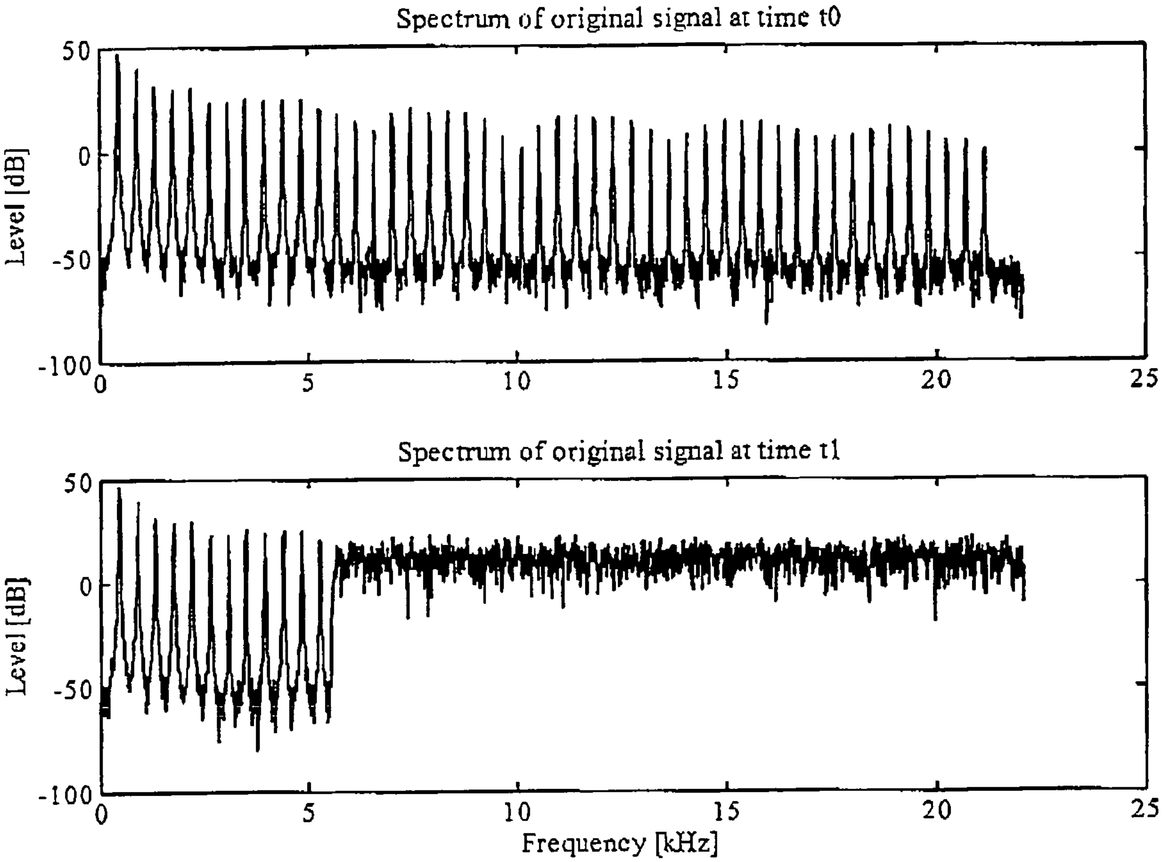
FIG. 2 illustrates the absolute spectrum of an original signal at time $t_0$, and time $t_1$.
Figure 3:
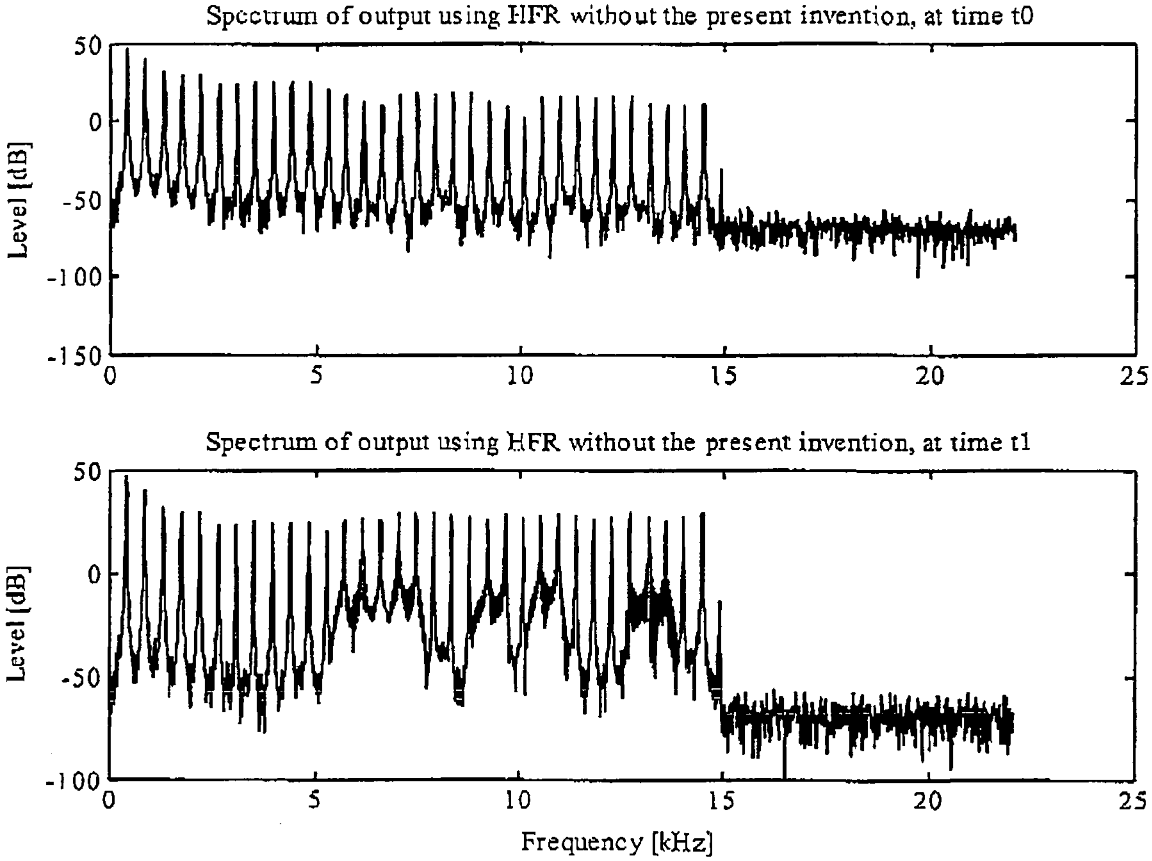
FIG. 3 illustrates the absolute spectrum of the output, at time $t_0$ and time $t_1$, of a prior art copy up HFR system without adaptive filtering.
Figure 4:
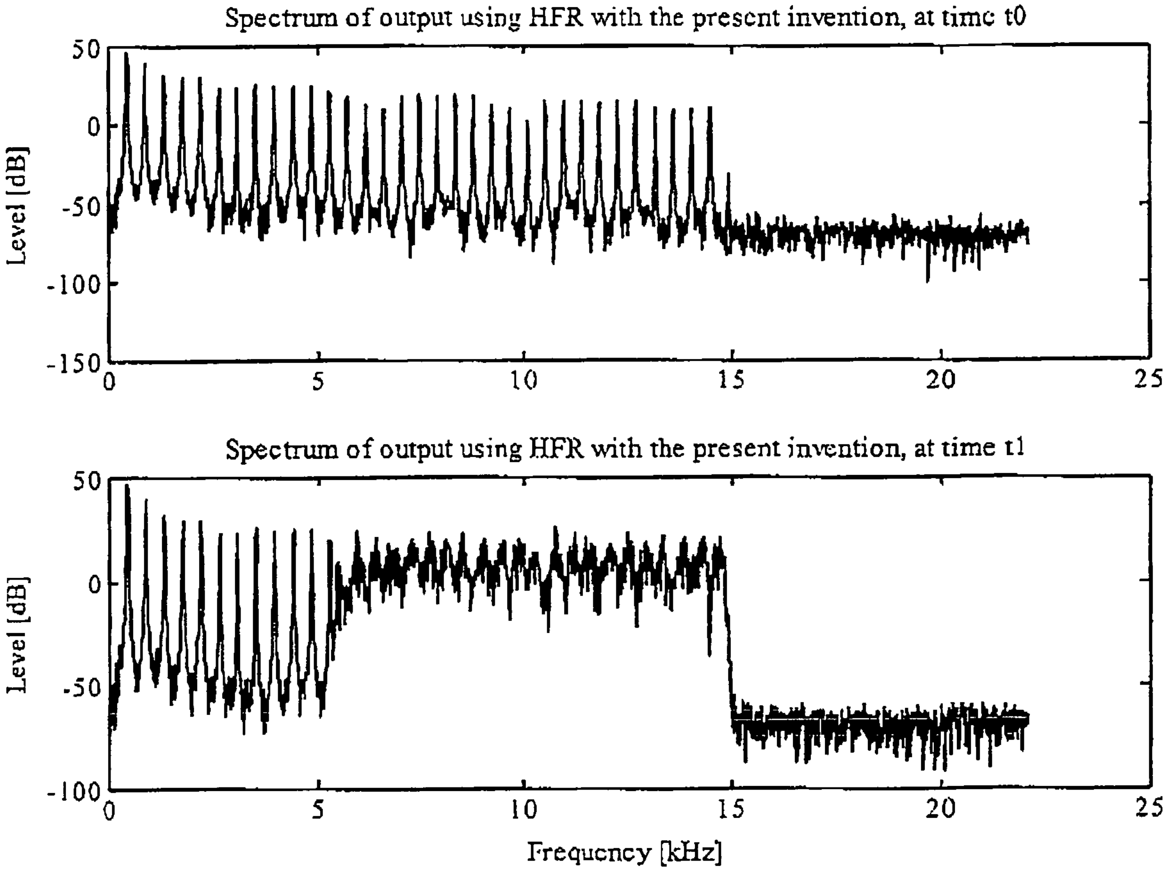
FIG. 4 illustrates the absolute spectrum of the output, at time $t_0$ and time $t_1$, of a copy up HFR system with adaptive filtering, according to the present invention.

The present invention drastically increases the performance of HFR systems, at a very low additional bitrate cost, since the information on the degree of whitening to be used in the decoder can be transmitted very efficiently. FIGS. 2-4 displays the performance of a system with the present invention compared to a system without, by means of illustrative absolute spectra. In FIG. 2 absolute spectra of the original signal at time $t_0$ and time $t_1$ are displayed. It is evident that the tonal character for the lowband and the highband of the signal is similar at time $t_0$, while they differ significantly at time $t_1$.

In FIG. 3 the output at time $t_0$ and time $t_1$ of a system using a copy-up based HFR without the present invention are displayed. Here, no spectral whitening is applied giving the correct tonal character at time $t_0$, but entirely wrong at time $t_1$. This causes very annoying artifacts. Similar results would be obtained for any constant degree of spectral whitening, albeit the artifacts would have different characters and occur at different instances. In FIG. 4 the output at time $t_0$ and time $t_1$ of a system using the present invention are displayed. Here it is evident that the amount of spectral whitening varies over time, which results in a sound quality far superior to that of a system without the present invention.

The Detector on the Encoder Side

In the present invention, a detector on the encoder-side is used to assess the best degree of spectral whitening (LPC order, bandwidth expansion factor and/or blending factor) to be used in the decoder, in order to obtain a highband as similar to the original as possible, given the currently used HFR method. Several approaches can be used in order to obtain a proper estimate of the degree of spectral whitening to be used in the decoder. In the following description below, it is assumed that the HFR algorithm does not substantially alter the tonal structure of the lowband spectrum during the generation of high frequencies, i.e. the generated highband has the same tonal character as the lowband. If such assumptions cannot be made the below detection can be performed using an analysis by synthesis, i.e. performing HFR on the original signal in the encoder and do the comparative study on the highbands of the two signals, rather than doing a comparative study on the lowband and highband of the original signal.

Figure 5A:
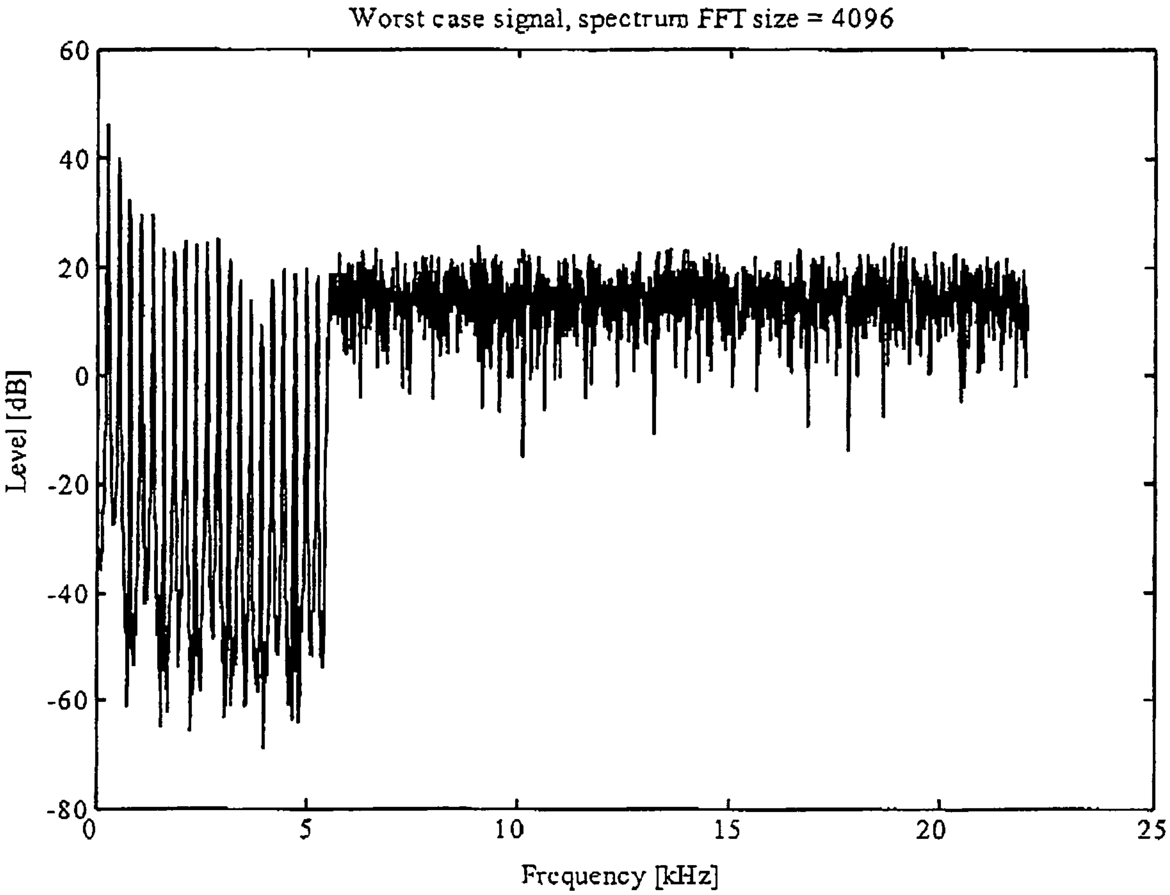
FIG. 5*a* illustrates a worst case signal according to the present invention.
Figure 5B:
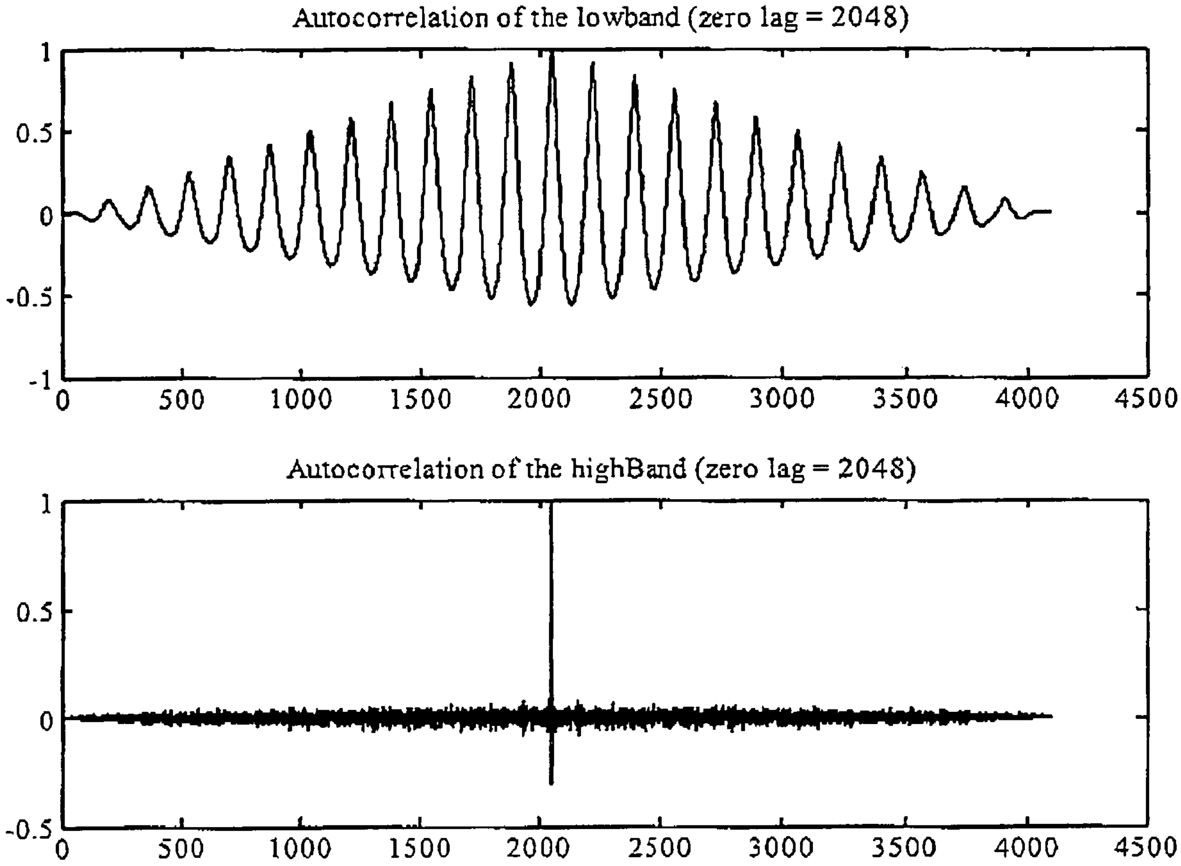
FIG. 5*b* illustrates the autocorrelation for the highband and lowband of the worst case signal.

One approach uses autocorrelation to estimate the appropriate amount of spectral whitening. The detector estimates the autocorrelation functions for the source range (i.e. the frequency range upon which the HFR will be based in the decoder) and the target range (i.e. the frequency range to be reconstructed in the decoder). In FIG. 5*a*. a worst case signal is described, with a harmonic series in the lowband and white noise in the highband. The different autocorrelation functions are displayed in FIG. 5*b*. Here it is evident that the lowband is highly correlated whilst the highband is not. The maximum correlation, for any lag larger than a minimum lag, is obtained for both the highband and the lowband. The quotient of the two is used to calculate the optimal degree of spectral whitening to be applied in the decoder. When implementing the present invention as outlined above, it may be preferable to use FFTs for the computation of the correlation. The autocorrelation of a sequence x(n) is defined by:

$$r_{xx}(m)=FFT^{-1}(|X(k)|^2), \tag{8}$$

where $$X(k)=FFT(x(n)). \tag{9}$$

Since the objective is to compare the difference of the autocorrelation in the highband and the lowband the filtering can be done in the frequency domain. This yields:

$$\begin{cases} X_{Lp}(k) = X(k)\cdot H_{Lp}(k) \\ X_{Hp}(k) = X(k)\cdot H_{Hp}(k) \end{cases}, \tag{10}$$

where $H_{Lp}(k)$ and $H_{Hp}(k)$ are the Fourier transforms of the LP and HP filters impulse responses.

From the above the autocorrelation functions for the lowband and highband can be calculated according to:

$$\begin{cases} r_{xxLp}(m) = FFT^{-1}(|X_{Lp}(k)|^2) \\ r_{xxHp}(m) = FFT^{-1}(|X_{Hp}(k)|^2) \end{cases}. \tag{11}$$

The maximum value, for a lag larger than a minimum lag, for each autocorrelation vector is calculated:

$$\begin{cases} r_{MaxLp} = \max(r_{xxLp})\ \forall\ m > \min Lag \\ r_{MaxHp} = \max(r_{xxHp})\ \forall\ m > \min Lag \end{cases}. \tag{12}$$

The quota of the two can be used to for instance map to a suitable bandwidth expansion factor.

The above implies that it would be beneficial to assess a general measurement of the predictability, i.e. the tonal to noise ratio of a signal in a given frequency band at a given time, in order to obtain a correct inverse filtering level for a given frequency band at a given time. This can be accomplished using the more refined approach below. Here a subband filterbank is assumed, it is well understood however that the invention is not limited to such.

A tonal to noise ratio q for each subband of a filter bank can be defined by using linear prediction on blocks of subband samples. A large value of q indicates a large amount of tonality, whereas a small value of q indicates that the signal is noiselike at the corresponding location in time and frequency. The q-value can be obtained using both the covariance method and the autocorrelation method.

For the covariance method, the linear prediction coefficients and the prediction error for the subband signal block [x(0), x(1), . . . , x (N−1)] can be computed efficiently by using the Cholesky decomposition, [Digital Processing of Speech Signals, Rabiner & Schafer, Prentice Hall, Inc., Englewood Cliffs, N.J. 07632, ISBN 0-13-213603-1, Chapter 8]. The tonal to noise ratio q is then defined by $$q = \frac{\Psi - E}{E}, \tag{13}$$

where $\Psi=|x(0)|^2+|x(1)|^2+\ldots+|x(N-1)|^2$ is the energy of the signal block, and E is the energy of the prediction error block.

For the autocorrelation method, a more natural approach is to use the Levinson-Durbin algorithm, [Digital Signal Processing, Principles, Algorithms and Applications, Third Edition, John G. Proakis, Dimitris G. Manolakis, Prentice Hall, International Editions, ISBN-0-13-394338-9, Chapter 11] where q is then defined according to $$q = \left(\prod_{i=1}^{p}(1-|K_i|^2)\right)^{-1} - 1, \tag{14}$$

where $K_i$ are the reflection coefficients of the corresponding lattice filter structure obtained from the prediction polynomial, and p is the predictor order.

The ratio between highband and lowband values of q is then used to adjust the degree of spectral whitening such that the tonal to noise ratio of the reconstructed highband approaches that of the original highband. Here it is advantageous to control the degree of whitening utilising the blending factor b (Eq. 6).

Assuming the tonal to noise ratio $q=q_H$ is measured in the highband and $q=q_L \geqq q_H$ is measured in the lowband, a suitable choice of whitening factor b is given by the formula $$b = 1 - \sqrt{\frac{q_H}{q_L}}. \tag{15}$$

To see this, a first step is to rewrite Eq. 6 in the form $$A_b(z)=A(z)+(1-b)(1-A(z)). \tag{16}$$

This shows that if the signal used to estimate A(z) is filtered with the filter $A_b(z)$, the predicted signal is suppressed by the gain factor 1−b and the prediction error is unaltered. As the tonal to noise ratio is the ratio of mean squared predicted signal to mean squared prediction error, a value of q prior to filtering is changed to $(1-b)^2$ q by the filtering operation. Applying this to the lowband signal produces a signal with tonal to noise ratio $(1-b)^2\, q_L$ and under the assumption that the applied HFR method does not alter tonality, the target value $q_H$ in the highband is reached exactly if b is chosen according to Eq. 15.

Figure 5C:
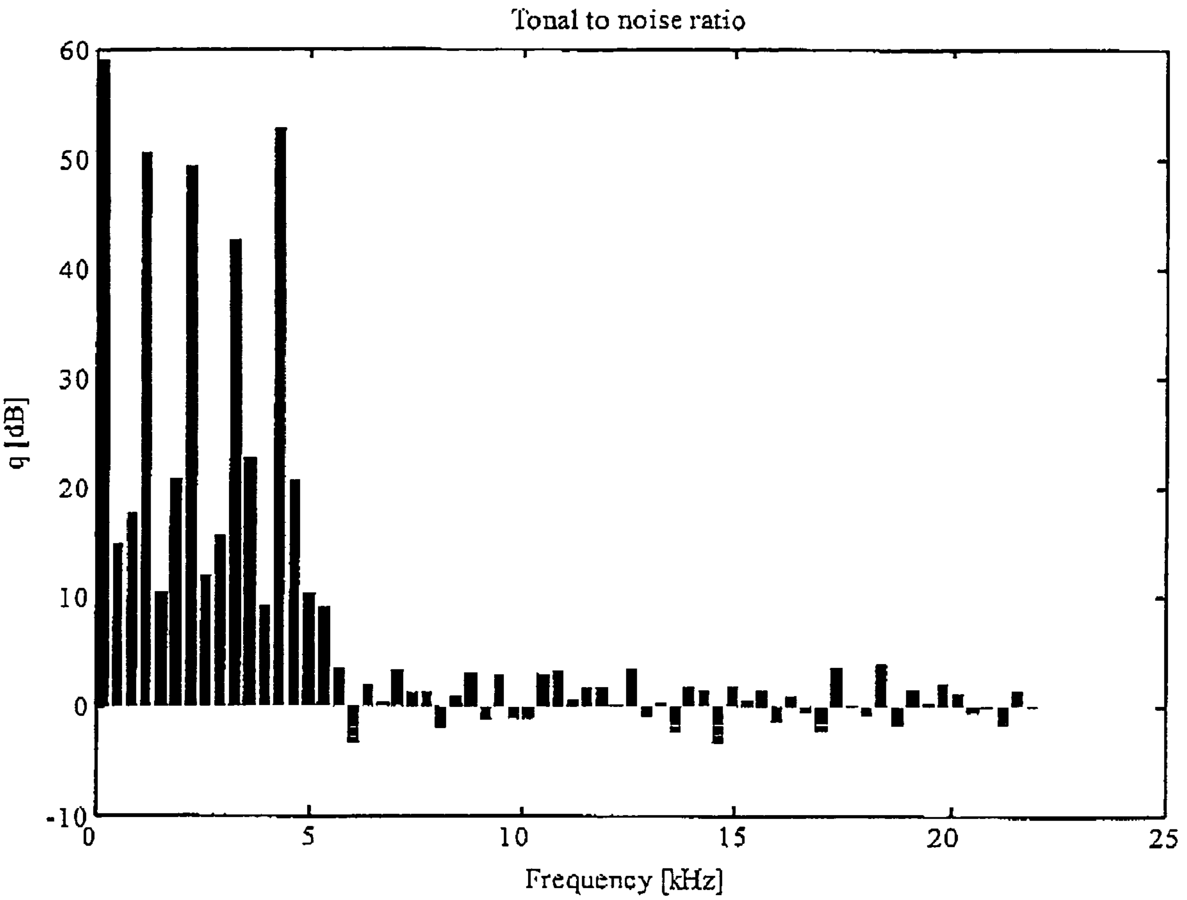
FIG. 5*c* illustrates the tonal to noise ratio q for different frequencies, according to the present invention.

The values of q based on prediction order p=2 in each subband of a 64 channel filter bank are depicted in FIG. 5*c*, for the signal of FIG. 5*a*. Significantly higher values are reached for the harmonic part of the signal than for the noisy part. The variability of the estimates in the harmonic part is due to the chosen frequency resolution and prediction order.

Adaptive LPC-Based Whitening in the Time Domain

The adaptive filtering in the decoder can be done prior to, or after the high-frequency reconstruction. If the filtering is performed prior to the HFR, it needs to consider the characteristics of the HFR-method used. When a frequency selective adaptive filtering is performed, the system must deduct from what lowband region a certain highband region will originate, in order to apply the correct amount of spectral whitening to that lowband region, prior to the HFR-unit. In the example below, of a time domain implementation of the current invention, a non-frequency selective adaptive spectral whitening is outlined. It should be obvious to any person skilled in the art that time-domain implementations of the present invention is not limited to the implementation described below.

Figure 6:
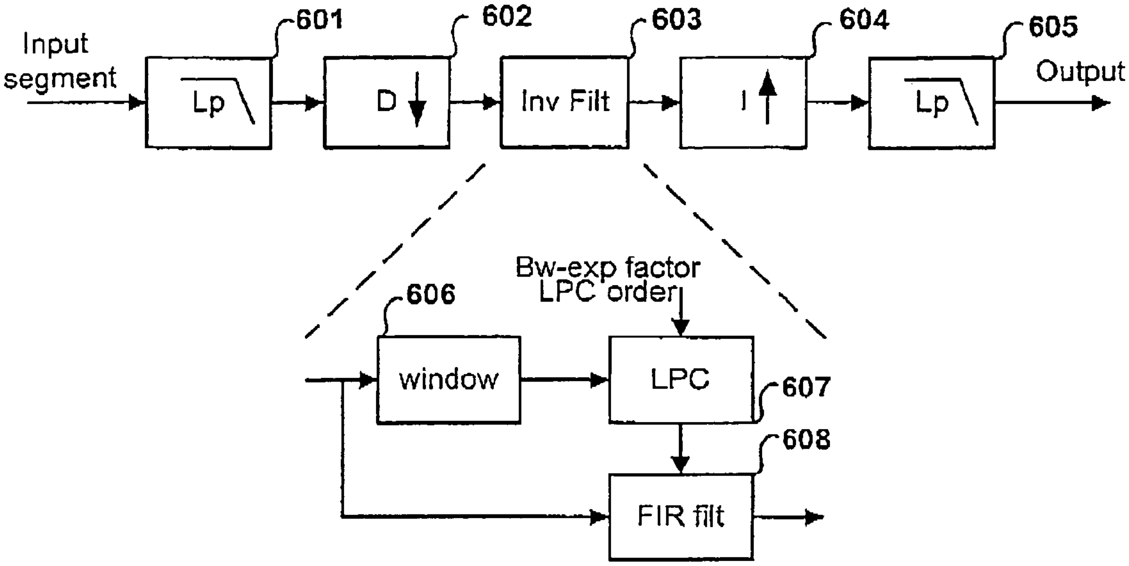
FIG. 6 illustrates a time domain implementation of the adaptive filtering in the decoder, according to the present invention.

When performing the adaptive filtering in the time domain, linear prediction using the autocorrelation method is preferred. The autocorrelation method requires windowing of the input segment used to estimate the coefficients $\alpha_k$, which is not the case for the covariance method. The filter used for the spectral whitening according to the present invention is $$H_{inv}(z, p, \rho) = 1 - \sum_{k=1}^{p} \alpha_k (z\rho)^{-k}, \tag{19}$$

where the gain factor G (in Eq. 5) is set to one. When the adaptive spectral whitening is performed prior to the HFR unit, an effective implementation is achieved since the adaptive filter can operate on a lower sampling rate. The lowband signal is windowed and filtered on a suitable time base with the predictor order and bandwidth expansion factors given by the encoder, according to FIG. 6. In the current implementation of the present invention the signal is low pass filtered 601 and decimated 602. 603 illustrate the adaptive filter. A window 606 is used to select the proper time segment for estimation of the A(z) polynomial, 50% overlap is used. The LPC-routine 607 extracts A(z) given the currently preferred LPC-order and bandwidth expansion factor, with a suitable relaxation. A FIR filter 608 is used to adaptively filter the signal segment. The spectrally whitened signal segments are upsampled 604, 605 and windowed together forming the input signal to the HFR unit.

Adaptive LPC-Based Whitening in a Subband Filter Bank

The adaptive filtering can be performed effectively and robustly by using a filter bank. The linear prediction and the filtering are done independently for each of the subband signals produced by the filter bank. It is advantageous to use a filterbank where the alias components of the subband signals are suppressed. This can be achieved by e.g. oversampling the filterbank. Artifacts due to aliasing emerging from independent modifications of the subband signals, which for example adaptive filtering results in, can then be heavily reduced. The spectral whitening of the subband signals is obtained through linear prediction analogous to the time domain method described above. If the subband signals are complex valued, complex filter coefficients are used for the linear prediction as well as for the filtering. The order of the linear prediction can be kept very low since the expected number of tonal components in each frequency band is very small for a system with a reasonable amount of filterbank channels. In order to correspond to the same time base as the time domain LPC, the number of subband samples in each block is smaller by a factor equal to the downsampling of the filter bank. Given the low filter order and small block sizes the prediction filter coefficients are preferably obtained using the covariance method. Filter coefficient calculation and spectral whitening can be performed on a block by block basis using subband sample time step L, which is smaller than the block length N. The spectrally whitened blocks should be added together using appropriate synthesis windowing.

Figure 7:
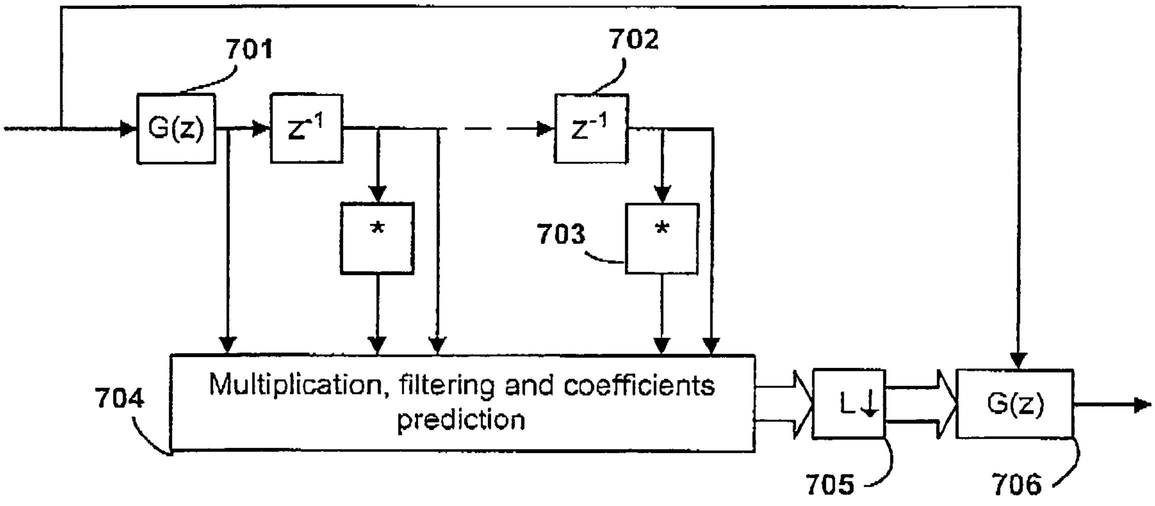
FIG. 7 illustrates a subband filterbank implementation of the adaptive filtering in the decoder, according to the present invention.

Feeding a maximally decimated filterbank with an input signal consisting of white Gaussian noise will produce subband signals with white spectral density. Feeding an oversampled filterbank with white noise gives subband signals with coloured spectral density. This is due to the effects of the frequency responses of the analysis filters. The LPC predictors in the filterbank channels will track the filter characteristics in the case of noise-like input signals. This is an unwanted feature, and benefits from compensation. A possible solution is pre-filtering of the input signals to the linear predictors. The pre-filtering should be an inverse, or an approximation of the inverse, of the analysis filters, in order to compensate for the frequency responses of the analysis filters. The whitening filters are fed with the original subband signals, as described above. FIG. 7 illustrates the whitening process of a subband signal. The subband signal corresponding to channel 1 is fed to the pre-filteringblock 701, and subsequently to a delay chain where the depth of the same depends on the filter order 702. The delayed signals and their conjugates 703 are fed to the linear prediction block 704, where the coefficients are calculated. The coefficients from every L:th calculation are kept by the decimator 705. The subband signals are finally filtered through the filterblock 706, where the predicted coefficients are used and updated for every L:th sample.

Practical Implementations

Figure 8:
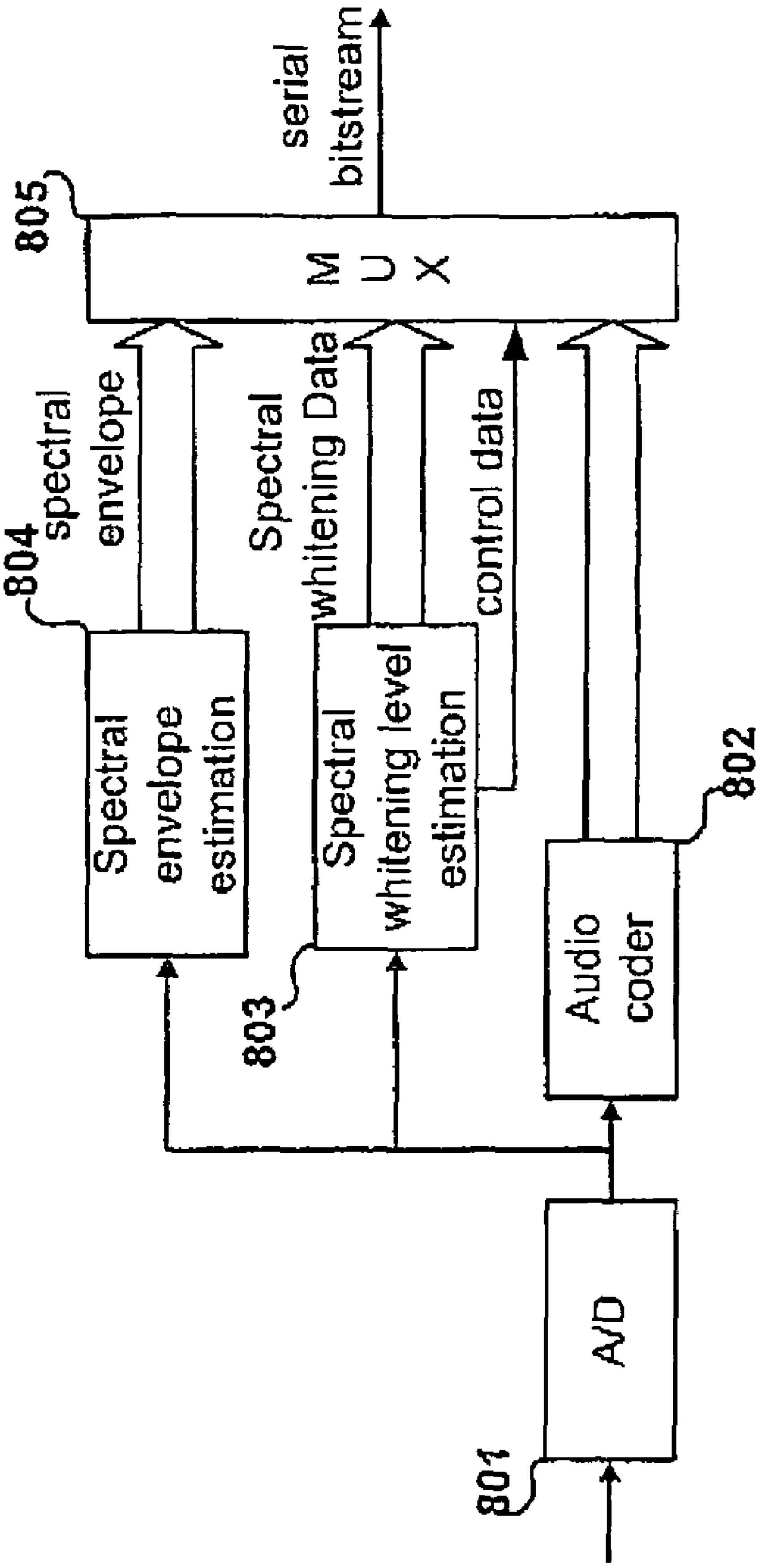
FIG. 8 illustrates an encoder implementation of the present invention.
Figure 9:
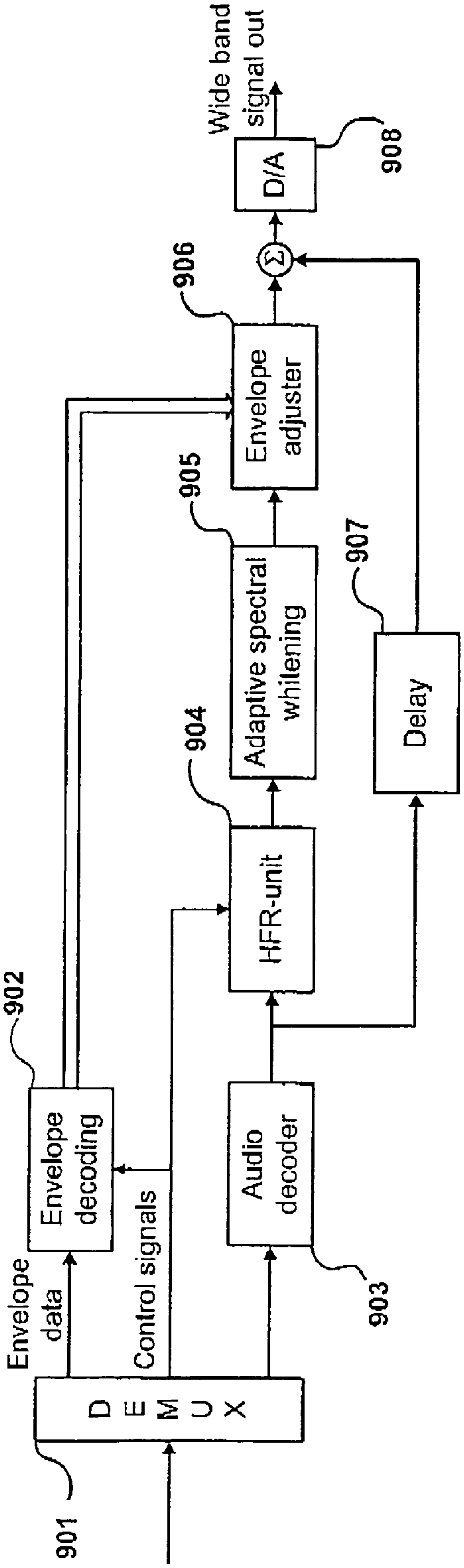
FIG. 9 illustrates a decoder implementation of the present invention.

The present invention can be implemented in both hardware chips and DSPs, for various kinds of systems, for storage or transmission of signals, analogue or digital, using arbitrary codecs. FIG. 8 and FIG. 9 shows a possible implementation of the present invention. In FIG. 8 the encoder side is displayed. The analogue input signal is fed to the A/D converter 801, and to an arbitrary audio coder, 802, as well as the inverse filtering level estimation unit 803, and an envelope extraction unit 804. The coded information is multiplexed into a serial bitstream, 805, and transmitted or stored. In FIG. 9 a typical decoder implementation is displayed. The serial bitstream is de-multiplexed, 901, and the envelope data is decoded, 902, i.e. the spectral envelope of the highband. The de-multiplexed source coded signal is decoded using an arbitrary audio decoder, 903. The decoded signal is fed to an arbitrary HFR unit, 904, where a highband is regenerated. The highband signal is fed to the spectral whitening unit 905, which performs the adaptive spectral whitening. Subsequently, the signal is fed to the envelope adjuster 906. The output from the envelope adjuster is combined with the decoded signal fed through a delay, 907. Finally, the digital output is converted back to an analogue waveform 908.

The invention claimed is:

1. A method for enhancement of a decoder in an audio source coding system using high-frequency reconstruction, comprising: subband filtering a lowband signal to obtain a plurality of subband signals; and adaptively, spectrally whiten a signal prior to High Frequency Reconstruction or after High Frequency Reconstruction, according to spectral whitening information indicating a required amount of spectral whitening at a given time, in order to obtain a similar tonal character of the highband after the High Frequency Reconstruction as in a highband of an original signal.

2. The method of claim 1, in which the required amount of spectral whitening varies over frequency.

3. The method of claim 2, in which the step of spectrally whiten is performed independently for the subbands.

4. The method of claim 3, in which the step of spectrally whitening includes linear prediction and filtering.

5. The method of claim 1, in which the step of subband filtering is performed using an over sampled filterbank.

6. The method of claim 4, in which the step of subband filtering is performed such that the subband signals are complex-valued, and in which complex filter coefficients are used in the linear prediction and filtering.

7. The method of claim 4, in which an order of the linear prediction is low.

8. The method of claim 4, in which prediction filter coefficients are obtained using a covariance method.

9. The method of claim 1, in which the step of spectrally whiten includes a filter coefficient calculation and a filtering using the filter coefficients, the calculation and the filtering being performed on a block by block basis using a subband sample time step being smaller than a block length.

10. The method of claim 9, in which the step of spectrally whiten includes adding together spectrally whitened blocks using synthesis windowing.

11. The method of claim 1, in which the step of spectrally whiten includes a step of prefiltering the subband samples using a filter having an inverse or an approximation of the inverse of the analyses filters used in the step of subband filtering.

12. The method of claim 1, in which the step of spectrally whiten includes the following steps: prefiltering a subband signal; feeding an output of the prefiltering into a delay chain having a depth depending on a filter order; feeding delayed signals and conjugates thereof to a linear prediction block for calculating coefficients; keeping coefficients from every L.sup.th calculation by a decimator; and filtering the subband signals using a filterblock where predicted coefficients are used and updated for every L.sup.th sample, where L is a subband sample time step.

13. An apparatus for enhancement of a decoder in an audio source coding system using high-frequency reconstruction, comprising: a subband filterbank for subband filtering a lowband signal to obtain a plurality of subband signals; and a whitening filter adaptively spectrally whiten a signal prior to High Frequency Reconstruction or after High Frequency Reconstruction, according to spectral whitening information indicating a required amount of spectral whitening at a given time, in order to obtain a similar tonal character of the highband after the High Frequency Reconstruction as in a highband of an original signal.

* * * * *